May 10, 1932.  C. KNOBLOCH  1,857,644

LIQUID LEVEL GAUGE

Filed Sept. 7, 1928

INVENTOR.
CARL KNOBLOCH.
BY Ely & Barrow
ATTORNEYS.

Patented May 10, 1932

1,857,644

UNITED STATES PATENT OFFICE

CARL KNOBLOCH, OF AKRON, OHIO

LIQUID LEVEL GAUGE

Application filed September 7, 1928. Serial No. 304,597.

This invention relates to gauges for tanks, such as gasoline tanks of automobiles.

The general purpose of the invention is to provide a pressure responsive device adapted to be threaded into the opening in the bottom of a tank so as to be readily accessible and having suitable connections to an indicating instrument, for example, one arranged on the dash of an automobile.

More particularly, the invention has for its object the provision in combination with a pressure responsive diaphragm adapted to be threaded to the bottom of a tank, of connections from the diaphragm to a fixed indicating instrument which will not be disturbed when connecting or disconnecting the diaphragm with the tank.

The foregoing and other objects are attained in the gauge construction illustrated in the accompanying drawings and described below.

Figure 1:
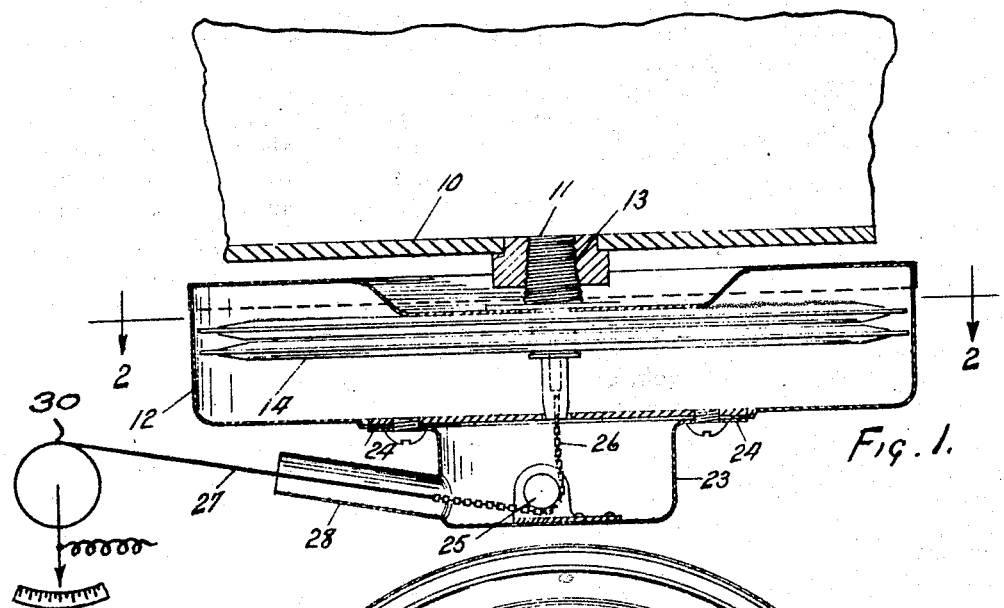
Figure 1 is a diametral section through a pressure responsive device shown attached to the bottom of a gasoline tank.
Figure 2:
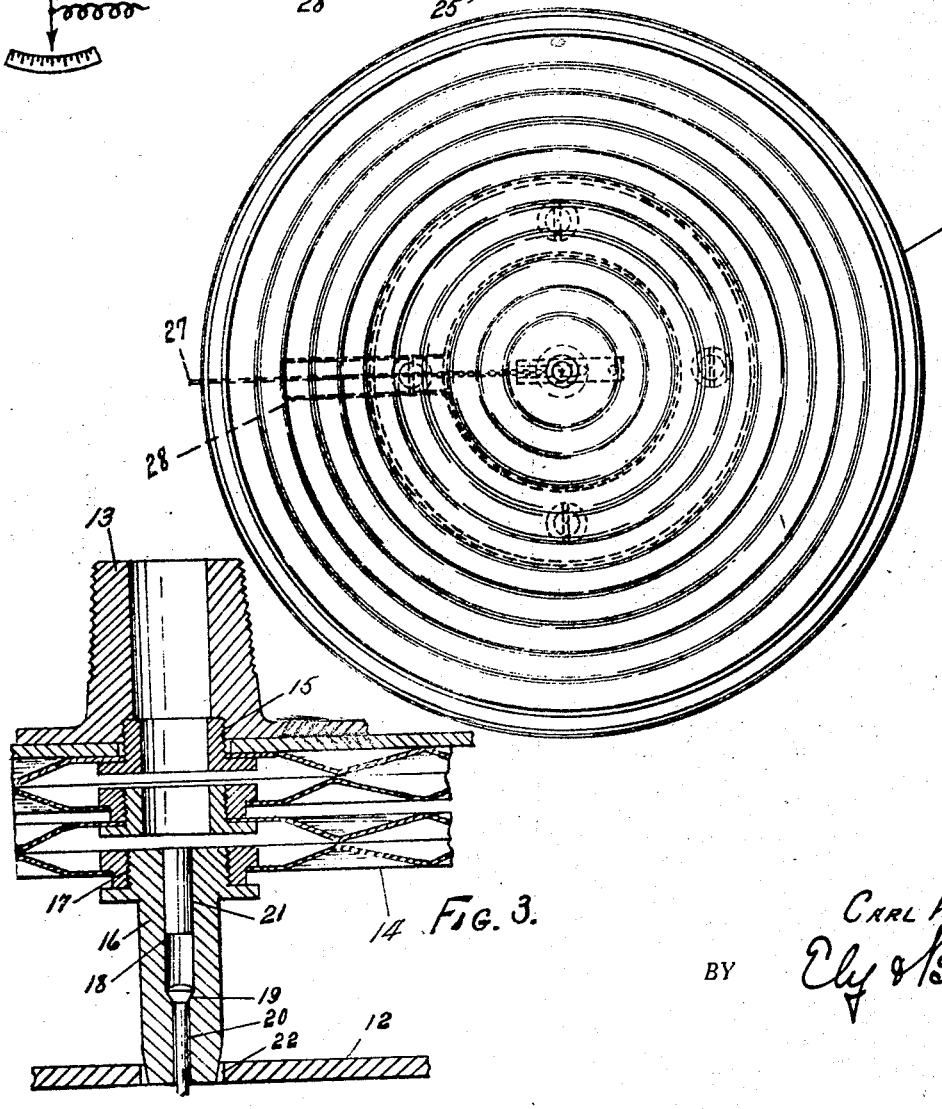
Figure 2 is a section on line 2—2 of Figure 1.
Figure 3:
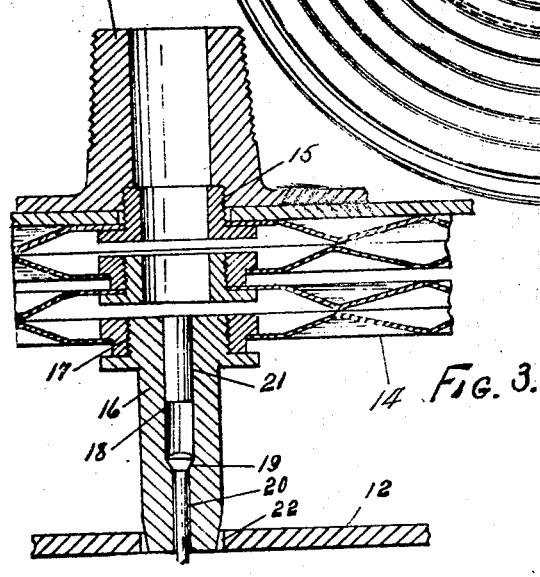
Figure 3 is an enlarged detail section illustrating the connections of the diaphragm to the nipple for threading into the tank and to the element for actuating the indicator.

Referring to the drawings, the numeral 10 designates a tank such as used for gasoline on an automobile, the bottom having a threaded aperture therein at 11.

The improved gauge includes a housing 12 having a nipple 13 thereon for threading into aperture 11 to secure the housing onto the bottom of the tank and also for connecting a pressure responsive diaphragm construction 14 thereto, the latter being arranged in the housing and threaded into the lower end of nipple 13 at 15.

For connecting the diaphragm at its lower end to any suitable indicating instrument, which is not a part of this invention though diagrammatically shown at 30, a swivel head 16 is threaded into the lower end of the diaphragm at 17. This head is provided with a bore 18 having a shoulder at 19 therein on which seats a swivel 20, the upper end of the bore being sealed by a plug 21 placed therein after the swivel is mounted in place. The lower end of the swivel head 16 is engaged in an aperture 22 in the bottom of housing 12.

A second housing 23 is swiveled at 24 onto the bottom of housing 12 and supports a pulley 25 thereon, about which is trained a flexible element such as a chain 26 connected to a headed pin 20 which is loosely or rotatably supported in the lower end of the bore 18, which is restricted for the purpose of receiving and supporting the pin. Chain 26 is in turn connected with a flexible element such as a wire 27 which leads to the indicating instrument for operation thereof through a tubular arm 28 on the housing 23.

By this arrangement, when the pressure responsive device is being threaded into or removed from the tank which is effected by rotating housing 12, twisting of the flexible connection is prevented by swivel 20 and also by reason of the fact that housing 23 is held substantially stationary because of the tension in the flexible connection, the housing 12 rotating relative thereto. Accordingly, the pressure responsive device is easily connected or disconnected with the tank when desired, as for installing or for draining the tank or replacing parts.

It will be apparent that by the invention, the construction of gauges of this character is greatly improved. Obviously, modifications of the invention may be resorted to without departing from the spirit thereof or the scope of the appended claims.

What is claimed is:

1. A gauge for a tank having a threaded aperture in its bottom, comprising a housing, a pressure responsive device therein adapted to be threaded into said aperture so as to communicate with the fluid in the tank, an indicator, a flexible element for connecting the bottom of said device to the indicator, swivel means for connecting the flexible element to said device, a second housing swiveled onto the bottom of the first housing, and a pulley in the second housing over which said flexible element is trained, said second housing having a tubular arm through which the flexible element is led out of the second housing.

2. A gauge for a tank having a threaded aperture in its bottom, comprising a housing, a pressure responsive device therein adapted to be threaded into said aperture so as communicate therethrough with fluid in the tank, an indicator, a flexible element for connecting the bottom of said device to the indicator, and swivel means for connecting the flexible element to said device.

3. A gauge for a tank having an aperture therein, comprising a housing, a pressure responsive device therein adapted to be mounted in said aperture so as to communicate therethrough with the fluid in the tank, an indicator, a flexible element for connecting the bottom of said device to the indicator, swivel means for connecting the flexible element to said device, a second housing swiveled onto the bottom of the first housing and formed with an aperture, and means in the second housing over which said flexible element is trained, said flexible element passing through the aperture in the second housing.

4. A gauge for a tank having an aperture therein, said gauge comprising a pressure-responsive device mounted upon the tank and in communication with the fluid therein through said aperture, an indicator, and flexible means connecting the indicator to the pressure-responsive device, said flexible means having swivel connection with the latter.

5. The combination with a fuel tank of an automobile having an aperture therein, of a pressure-responsive device secured to the tank and having communication with the fluid therein through said aperture, an indicator relatively remote from the pressure-responsive device, and attenuated flexible means swiveled to the latter and operatively connecting it with the indicator.

6. The combination with a tank having an aperture in the bottom thereof, a pressure responsive device connected to the outside of the tank and in communication with the tank through said aperture, a housing about said device, a second housing below the first and swivelly connected thereto, and an axial stud projecting from the device, said stud adapted to move toward and from and at times extending in said second housing.

7. The combination with a tank having an aperture in the bottom thereof, a pressure responsive diaphragm connected to the outside of the tank and in communication with the tank through said aperture, a short rigid stud attached to and projecting from the center of the diaphragm outside of the tank, an indicator relatively remote from said diaphragm, and attenuated flexible means connecting the indicator relatively remote from said diaphragm to the stud, said flexible means being swivelled in the latter.

8. The combination with a tank having an aperture in the bottom thereof, a pressure responsive diaphragm connected to the outside of the tank and in communication with the tank through said aperture, an indicator remote from the diaphragm, an axial short stud projecting from the center of the diaphragm, a guide for the stud, and a connection from the stud to an indicator, said connection being swiveled to the stud.

CARL KNOBLOCH.